United States Patent
Graf et al.

(10) Patent No.: US 9,652,263 B2
(45) Date of Patent: May 16, 2017

(54) MIGRATING SERVERS INTO A SECURED ENVIRONMENT

(71) Applicant: International Business Machines Corporation, Armonk, NY (US)

(72) Inventors: Florian D. Graf, Zurich (CH); Michael E. Nidd, Zurich (CH); Birgit M. Pfitzmann, Wettswil (CH); Rudiger Rissmann, Zurich (CH); Gerhard Widmayer, Herrenberg (DE); Min Xiang, Beijing (CN); Li Juan Xiao, Beijing (CN); Shao Yang Yu, Beijing (CN); Chi L. Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/739,064

(22) Filed: Jun. 15, 2015

(65) Prior Publication Data
US 2016/0364252 A1   Dec. 15, 2016

(51) Int. Cl.
G06F 9/00 (2006.01)
G06F 9/445 (2006.01)
G06F 9/44 (2006.01)

(52) U.S. Cl.
CPC ........ G06F 9/44505 (2013.01); G06F 9/4416 (2013.01)

(58) Field of Classification Search
CPC ........................... G06F 9/44505; G06F 9/4416
USPC ......... 718/1; 709/203, 235, 226, 223; 713/2; 726/28
See application file for complete search history.

(56) References Cited

U.S. PATENT DOCUMENTS

| 7,769,720 | B2  |   | 8/2010  | Armington |              |
|-----------|-----|---|---------|-----------|--------------|
| 7,823,145 | B1  | * | 10/2010 | Le        | G06F 8/65    |
|           |     |   |         |           | 709/203      |
| 8,065,676 | B1  | * | 11/2011 | Sahai     | G06F 9/5077  |
|           |     |   |         |           | 709/226      |
| 8,789,208 | B1  | * | 7/2014  | Sundaram  | H04L 29/06   |
|           |     |   |         |           | 726/28       |
| 9,319,274 | B1  | * | 4/2016  | Wei       | H04L 41/0823 |

(Continued)

FOREIGN PATENT DOCUMENTS

| DE | WO 2013084146 A1 * | 6/2013 | ............... G06F 8/65 |
| WO | 2013005923 A1 | 1/2013 | |

OTHER PUBLICATIONS

"Discovering Source Workloads and Migration Targets", NetIQ Documentation: PlateSpin Migrate 9.3 User Guide—Apr. 4, 2014, 8 pages, <https://www.netiq.com/documentation/platespin_migrate_9/user/data/bgw397r.html>.

(Continued)

Primary Examiner — Aurel Prifti
(74) Attorney, Agent, or Firm — Maeve Carpenter

(57) ABSTRACT

In one approach, one or more computer processors provision an instance in a cloud computing environment, wherein the instance includes one or more local disks. The one or more computer processors boot the instance from a boot image such that an operating system exists in a main memory of the instance. The one or more computer processors copy an image file to the one or more local disks of the instance, where copying the image file overwrites the one or more local disks. The one or more computer processors reboot the instance.

17 Claims, 6 Drawing Sheets

(56) References Cited

U.S. PATENT DOCUMENTS

| | | | |
|---|---|---|---|
| 2007/0192466 A1* | 8/2007 | Nahum | G06F 9/4416 709/223 |
| 2008/0184022 A1* | 7/2008 | Peacock | G06F 11/1417 713/2 |
| 2009/0260007 A1* | 10/2009 | Beaty | G06F 9/5077 718/1 |
| 2013/0297821 A1* | 11/2013 | Tanenbaum | H04L 47/10 709/235 |
| 2014/0149591 A1 | 5/2014 | Bhattacharya et al. | |
| 2014/0149983 A1 | 5/2014 | Bonilla et al. | |
| 2015/0058839 A1* | 2/2015 | Madanapalli | G06F 9/45558 718/1 |

OTHER PUBLICATIONS

"Migration of servers to Proxmox VE", Proxmox, last modified on Mar. 31, 2015, 19 pages, <https://pve.proxmox.com/wiki/Migration_of_servers_to_Proxmox_VE>.

"Working with Virtual Machines", Apache CloudStack Administration Documentation 4.5, downloaded on Apr. 8, 2015, 33 pages, <http://cloudstack-administration.readthedocs.org/en/latest/virtual_machines.html>.

\* cited by examiner

MIGRATING SERVERS INTO A SECURED ENVIRONMENT

TECHNICAL FIELD

The present invention relates generally to the field of computer systems, and more particularly to migrating servers into a secured environment.

BACKGROUND

The use of virtualization is becoming widespread. Virtualization describes a software abstraction that separates a computer resource and its use from an underlying physical device. Generally, a virtual machine (VM) provides a software execution environment and may have a virtual processor, virtual system memory, virtual storage, and various virtual devices. Virtual machines have the ability to accomplish tasks independent of particular hardware implementations or configurations. System virtualization is implemented through some managing functionality, typically hypervisor technology. Hypervisors, also called virtual machine managers (VMMs), use a thin layer of code in software or firmware to achieve fine-grained, dynamic resource sharing. Because hypervisors provide the greatest level of flexibility in how virtual resources are defined and managed, they are generally the primary technology for system virtualization.

Virtual machines may be migrated between a source host computing platform ("the source host") and a destination host computing platform ("the destination host") connected over a network, which may be a local area network or a wide area network that may include the Internet. Migration can include a move from a source environment to a target environment where the source environment is separate and under different management and security control than the target environment. Whole-instance migration includes capturing an entire operating system (OS) with the software and data included in image form, transferring the system to a new environment and restarting the system. Whole-instance migration is often needed when a customer does not have sufficient documentation of their applications for easy re-install. In addition, whole-instance migration can capture changes that were made to the server after the initial server setup that were not properly documented.

Virtual to virtual (V2V) server migrations and physical to virtual (P2V) server migrations are typically performed by tools that write from a customer zone onto a hypervisor in a cloud environment, such as an infrastructure-as-a-service (IaaS) virtual machine, where the customer zone is a secure network, protected by firewalls, and where both the customer and a cloud administrator have access. Often, such as in a cloud environment which typically serves multiple customers, the target hypervisor, a key component in securing separation between customers, is in a secured environment, such that data flow directly from the customer zone is not permitted. In order to address network security, migration may be performed across multiple intermediate zones, requiring multiple copy steps. In addition, cross-zone traffic may have to pass through firewalls and may be restricted in bandwidth, while storage at intermediate steps may limit scalability.

SUMMARY

A first aspect of the present invention discloses a method including one or more computer processors provisioning an instance in a cloud computing environment, wherein the instance includes one or more local disks. The one or more computer processors boot the instance from a boot image such that an operating system exists in a main memory of the instance. The one or more computer processors copy an image file to the one or more local disks of the instance, where copying the image file overwrites the one or more local disks. The one or more computer processors reboot the instance.

A second aspect of the present invention discloses a computer program product including one or more computer readable storage device and program instructions stored on the one or more computer readable storage device. The stored program instructions include program instructions to provision an instance in a cloud computing environment, wherein the instance includes one or more local disks. The stored program instructions include program instructions to boot the instance from a boot image such that an operating system exists in a main memory of the instance. The stored program instructions include program instructions to copy an image file to the one or more local disks of the instance, where copying the image file overwrites the one or more local disks. The stored program instructions include program instructions to reboot the instance.

A third aspect of the present invention discloses a computer system including one or more computer processors and one or more computer readable storage device, wherein the program instructions are stored on the one or more computer readable storage device for execution by at least one of the one or more computer processors. The stored program instructions include program instructions to provision an instance in a cloud computing environment, wherein the instance includes one or more local disks. The stored program instructions include program instructions to boot the instance from a boot image such that an operating system exists in a main memory of the instance. The stored program instructions include program instructions to copy an image file to the one or more local disks of the instance, where copying the image file overwrites the one or more local disks. The stored program instructions include program instructions to reboot the instance.

In yet another aspect, provisioning an instance in a cloud computing environment includes, before the booting the instance from the boot image, shutting down, by the one or more computer processors, the instance, attaching, by the one or more computer processors, a boot image to the instance, and changing, by the one or more computer processors, a boot sequence such that subsequent booting of the instance utilizes the attached boot image.

In yet another aspect, copying an image file to the one or more local disks of the instance includes mounting, by the one or more computer processors, a file server such that an image file included in the file server is accessible to the operating system of the instance, and copying, by the one or more computer processors, the image file from the file server to the one or more local disks of the instance.

In yet another aspect, provisioning an instance in a cloud computing environment includes identifying, by the one or more computer processors, a primary disk of the instance, mounting, by the one or more computer processors, the primary disk, and injecting, by the one or more computer processors, one or more scripts into the primary disk such that the one or more scripts are run during a subsequent reboot of the instance.

DETAILED DESCRIPTION

Embodiments of the present invention recognize that improvements to a migration process may be made by providing a method where data flows are inside the customer zone, making the process permissible. Embodiments of the present invention are independent of an operating system and do not require additional copying or transferring operations, therefore shortening the migration timeline. Embodiments of the present invention further recognize that properly reformatting image data is a more optimal approach than traditional migration processes where the image data is not directly runnable. Embodiments of the present invention recognize that by using a migration process that starts by provisioning a corresponding virtual machine, the process ensures correct registration of the migrated virtual machine in the cloud, thereby replacing all disks correctly and not being dependent on starting with an empty slot. Embodiments of the present invention further recognize that with existing techniques, the target environment may have different network addresses and require a root password to the source instance, whereas embodiments of the present invention ensure network access and authentication to the image after copying. Embodiments of the present invention also have an advantages of mapping multiple internet protocol (IP) addresses to correct interfaces and mapping multiple disks correctly. Implementation of embodiments of the invention may take a variety of forms, and exemplary implementation details are discussed subsequently with reference to the Figures.

Figure 1:
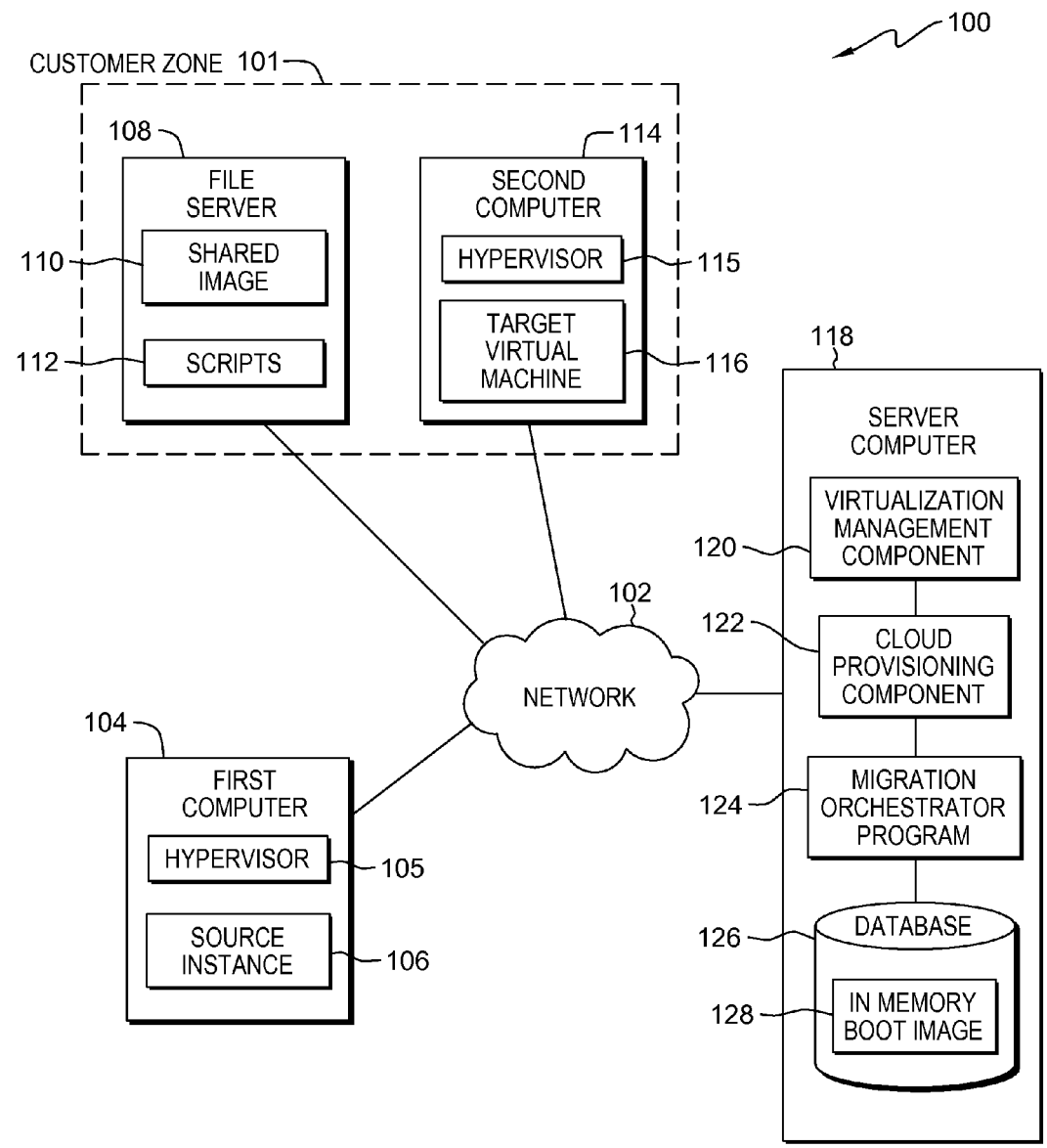
FIG. 1 is a functional block diagram illustrating a virtualized computing environment, in accordance with an embodiment of the present invention.

FIG. 1 is a functional block diagram illustrating a virtualized computing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Virtualized computing environment 100 includes first computer 104, file server 108, second computer 114, and server computer 118, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between first computer 104, file server 108, second computer 114, and server computer 118, and other computing devices (not shown) within virtualized computing environment 100. In one embodiment, first computer 104 is considered a source environment, and the remaining components of FIG. 1 can be referred to as a target environment.

First computer 104 and second computer 114 can each be a standalone computing device, a management server, a web server, a mobile computing device, or any other electronic device or computing system capable of receiving, sending, and processing data. In other embodiments, first computer 104 and second computer 114 can each represent a server computing system utilizing multiple computers as a server system, such as in a cloud computing environment ("the cloud"). In another embodiment, first computer 104 and second computer 114 can each be a laptop computer, a tablet computer, a netbook computer, a personal computer (PC), a desktop computer, a personal digital assistant (PDA), a smart phone, or any programmable electronic device capable of communicating with file server 108, server computer 118, and other computing devices (not shown) within virtualized computing environment 100 via network 102. In another embodiment, first computer 104 and second computer 114 each represent a computing system utilizing clustered computers and components (e.g., database server computers, application server computers, etc.) that act as a single pool of seamless resources when accessed within virtualized computing environment 100. First computer 104 includes hypervisor 105 and source instance 106. Second computer 114 resides in a customer zone, such as customer zone 101, and includes hypervisor 115 and target virtual machine (VM) 116. In general, hypervisor 105 and hypervisor 115 may manage the operating systems and execution of source instance 106 and target VM 116, respectively. In some embodiments, hypervisor 105 and hypervisor 115 can each represent a plurality of hypervisors within virtualized computing environment 100. Customer zone 101 is a secure network, protected by firewalls, where both the customer and a cloud administrator have access. Customer zone 101 is specific to a particular customer, and although second computer 114 may include VMs from other customers, security is provided within customer zone 101 such that other customers do not share access to target VM 116.

In exemplary embodiments, source instance 106 represents one or more virtual machines partitioned from first computer 104, and target VM 116, also described as an instance, represents one or more virtual machines partitioned from second computer 114. Source instance 106 and target VM 116 are each a software implemented abstraction of hardware of first computer 104 and second computer 114, respectively. Source instance 106 and target VM 116 can each be utilized to emulate functions of a physical computer (e.g., execute programs). In one embodiment, resources of first computer 104 (e.g., memory, central processing units (CPUs), storage devices, and I/O devices (not shown)) can be partitioned into one or more virtual machines in source instance 106. In one embodiment, resources of second computer 114 (e.g., memory, central processing units (CPUs), storage devices, and I/O devices (not shown)) can be partitioned into one or more virtual machines in target VM 116. In one embodiment, source instance 106 may reside on second computer 114, or elsewhere in the environment. In an embodiment where the migration process is P2V, source instance 106 may not have been instantiated as a virtual machine managed by hypervisor 105, and may have been built for the purpose of simulating a virtual machine. In the depicted embodiment, target VM 116 is an instance created from a copy of source instance 106.

File server 108 is a computing device connected to network 102. File server 108 provides a location for shared disk access, i.e., shared storage of computer files (such as documents, sound files, photographs, movies, images, databases, etc.) that can be accessed by other computing devices connected to network 102. File server 108 enables the storage and retrieval of data. File server 108 can represent one or more file servers. File server 108 resides in a customer zone, such as customer zone 101, and is a staging destination for a copy of source instance 106 to reside to enable copying to target VM 116 during the server migration process. In an embodiment where file server 108 represents multiple file servers, parallel migrations are enabled. File server 108 includes shared image 110 and scripts 112.

Shared image 110 is a copy of source instance 106 that exists as a compressed file. Since file server 108 resides in customer zone 101, shared image 110 can be reached by target VM 116 for copying during the migration process without concerns regarding network security.

Scripts 112 are injected into target VM 116 and run after target VM 116 boots up. In one embodiment, scripts 112 include a script to permanently change network configuration. In another embodiment, scripts 112 include a script for access enablement by tools. For example, scripts 112 may install a secure shell (SSH) package and an initial public key of migration orchestrator program 124 on server computer 118. SSH is a cryptographic (encrypted) network protocol for initiating text-based shell sessions on remote machines in a secure way. SSH uses public-key cryptography to authenticate a remote computer and allow the remote computer to authenticate a user, if necessary. In another example, scripts 112 may install an agent of a systems management tool that can then make further adjustments on target VM 116.

Server computer 118 can be a standalone computing device, a management server, a web server, a mobile computing device, or any other electronic device or computing system capable of receiving, sending, and processing data. In other embodiments, server computer 118 can represent a server computing system utilizing multiple computers as a server system, such as in a cloud computing environment. In another embodiment, server computer 118 can be a laptop computer, a tablet computer, a netbook computer, a personal computer (PC), a desktop computer, a personal digital assistant (PDA), a smart phone, or any programmable electronic device capable of communicating with first computer 104, file server 108, second computer 114, and other computing devices, such as a client computing device (not shown), within virtualized computing environment 100 via network 102. In another embodiment, server computer 118 represents a computing system utilizing clustered computers and components (e.g., database server computers, application server computers, etc.) that act as a single pool of seamless resources when accessed within virtualized computing environment 100. Server computer 118 includes virtualization management component 120, cloud provisioning component 122, migration orchestrator program 124, and database 126.

Virtualization management component 120 manages virtualization technology, as is known in the art, within virtualized computing environment 100. Virtualization management component 120 may assist in controlling aspects of a hypervisor. For example, virtualization management component 120 may enable a user to create, edit, start, and stop VMs, as well as view and control each VM's console. In addition, virtualization management component 120 may enable a user to see performance and utilization statistics for each VM. Virtualization management component 120 may also assist in allocating and optimizing virtual resources for efficiency. In addition, virtualization management component 120 may automate deployment of a virtual machine. Both cloud provisioning component 122 and migration orchestrator program 124 use virtualization management component 120 to assist in a server migration process.

Cloud provisioning component 122 prepares a VM, also known as an instance, for deployment on a cloud, as is known in the art. Cloud provisioning component 122 provisions target VM 116 such that target VM 116 includes the parameters of source instance 106 specified by a system administrator. For example, cloud provisioning component 122 may provision target VM 116 with a host name, an operating system (OS) type and version, a size, a service level, a number and size of disks, a number of network interfaces, and a number of internet protocol (IP) addresses. In another embodiment, cloud provisioning component 122 may provision target VM 116 based on a VM template (not shown) that was utilized to generate source instance 106.

Migration orchestrator program 124 directs server migration in a secured environment. Migration orchestrator program 124 receives a target VM, such as target VM 116, that cloud provisioning component 122 previously provisioned. Migration orchestrator program 124 shuts down the target VM, attaches a boot image, and boots the target VM such that the main memory includes the OS. Migration orchestrator program 124 causes the target VM to copy a source image VM, such as shared image 110, over the existing target VM disks. Migration orchestrator program 124 enables the migration to the target VM to occur within the customer zone, thus circumventing any concerns regarding network security. Migration orchestrator program 124 is depicted and described in further detail with respect to FIG. 3.

Database 126 resides on server computer 118. In another embodiment, database 126 can reside elsewhere in virtualized computing environment 100. A database is an organized collection of data. Database 126 can be implemented with any type of storage device capable of storing data and configuration files that can be accessed and utilized by server computer 118, such as a database server, a hard disk drive, or a flash memory. In other embodiments, database 126 can represent multiple storage devices within server computer 118. Database 126 stores in memory boot image 128, which migration orchestrator program 124 uses in the server migration process. In one embodiment, in memory boot image 128 may be a file or a disk, physical or virtual, such as a virtual compact disk (CD). In another embodiment, in memory boot image 128 may be written onto a disk included in target VM 116 during VM provisioning, and then may be unmounted after booting is complete. In memory boot image 128 may be in an ISO file format. In general, a boot image includes the operating system, utilities and diagnostics, as well as boot and data recovery information. In memory boot image 128 is independent of source instance 106 and is a static image that is read-only. Use of in memory boot image 128 allows a disk to be unmounted without damaging the running OS.

Figure 2:
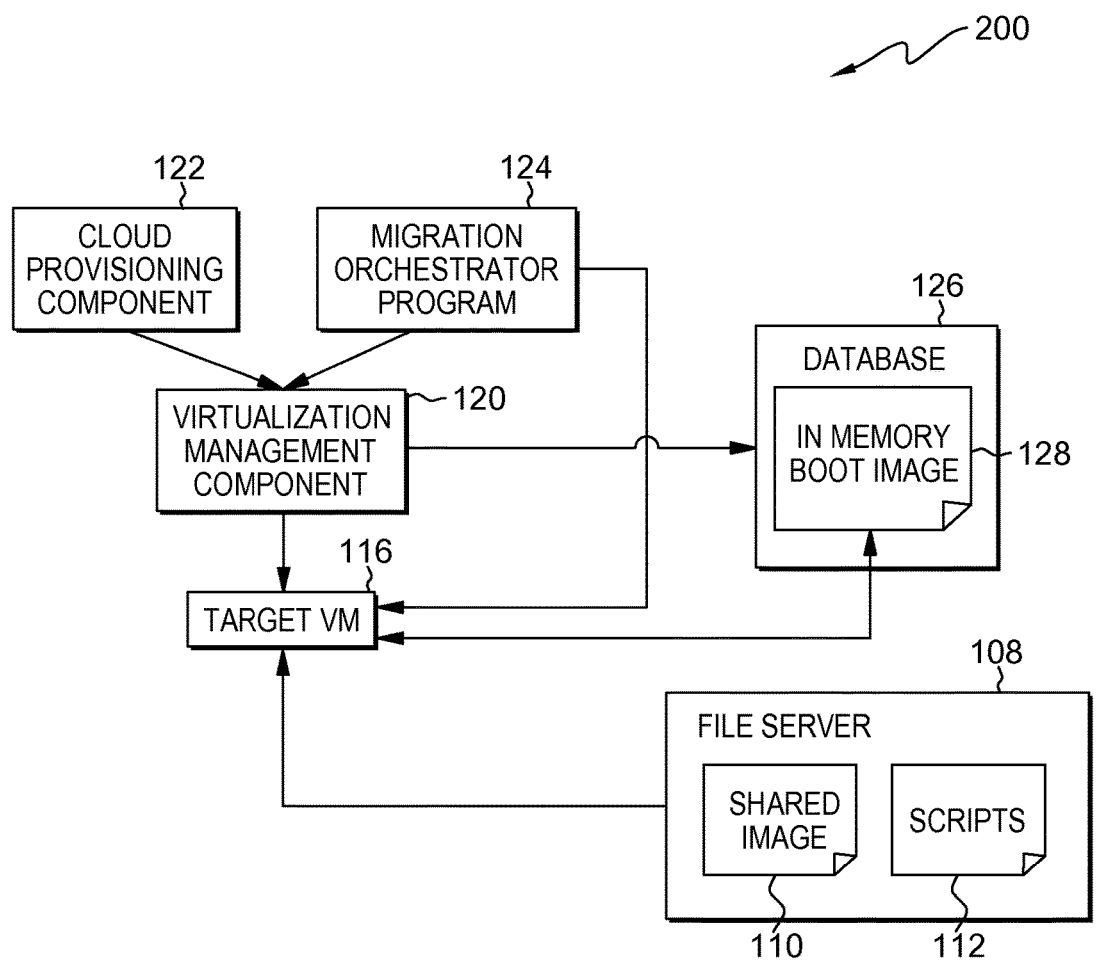
FIG. 2 is a flow diagram depicting a server migration process, on a plurality of computing devices within the virtualized computing environment of FIG. 1, in accordance with an embodiment of the present invention.

FIG. 2 is flow diagram 200 depicting a server migration process, on a plurality of computing devices within virtualized computing environment 100 of FIG. 1, in accordance with an embodiment of the present invention. Flow diagram 200 indicates the flow of information during the server migration process between various computing devices. For example, cloud provisioning component 122 utilizes virtualization management component 120 to provision an instance, such as target VM 116, in preparation for the migration process. Migration orchestrator program 124 uses virtualization management component 120 to perform various steps in the migration process, as are described with respect to FIG. 3. Migration orchestrator program 124 controls virtualization management component 120 using an application programming interface (API). Migration orchestrator program 124 also interacts directly with target VM 116 to perform various steps in the migration process, issuing commands via SSH.

Virtualization management component 120 controls both target VM 116 and database 126. Database 126 includes in memory boot image 128. When migration orchestrator program 124 issues an appropriate command, virtualization management component 120 attaches in memory boot image 128 as a disk to target VM 116, enabling target VM 116 to boot from in memory boot image 128 during the migration process.

File server 108 includes shared image 110 and scripts 112. Migration orchestrator program 124 copies shared image 110 onto target VM 116. Migration orchestrator program 124 injects scripts 112 to target VM 116 to configure target VM 116 for automated execution.

Figure 3:
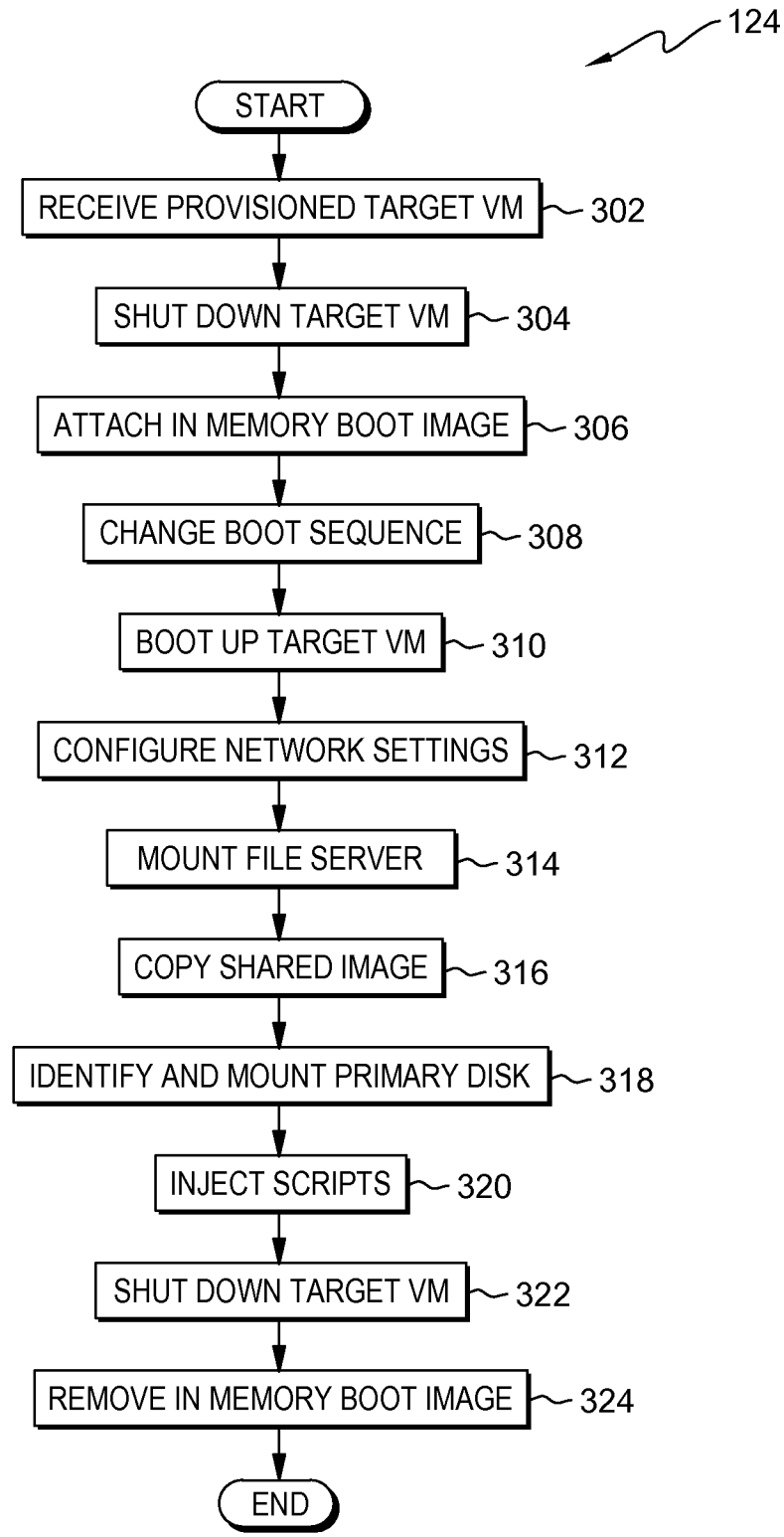
FIG. 3 is a flowchart depicting operational steps of a migration orchestrator program, on a server computer within the virtualized computing environment of FIG. 1, for server migration into a secured environment, in accordance with an embodiment of the present invention.

FIG. 3 is a flowchart depicting operational steps of migration orchestrator program 124, on server computer 118 within virtualized computing environment 100 of FIG. 1, for server migration into a secured environment, in accordance with an embodiment of the present invention.

Migration orchestrator program 124 receives a provisioned target VM (step 302). Migration orchestrator program 124 begins the migration process with a target VM, such as target VM 116, which cloud provisioning component 122 previously provisioned. Starting the migration process by provisioning a corresponding virtual machine is advantageous because the process ensures correct registration of the migrated virtual machine in the cloud, thereby replacing all disks correctly and not being dependent on starting with an empty slot.

Migration orchestrator program 124 shuts down target VM (step 304). Because provisioning leaves target VM 116 in a power-on mode, migration orchestrator program 124 shuts down target VM 116 in preparation for the next steps in the migration process.

Migration orchestrator program 124 attaches in memory boot image (step 306). Migration orchestrator program 124 retrieves an in memory boot image, such as in memory boot image 128, as discussed with respect to FIG. 1, and attaches in memory boot image 128 to target VM 116 as a disk via a command to virtualization management component 120.

Migration orchestrator program 124 changes a boot sequence (step 308). A standard boot sequence may include the following priority for devices from which to boot: removable devices, hard disk, CD, network. In one embodiment, as part of the migration process, migration orchestrator program 124 issues a command to virtualization management component 120 to change the boot sequence such that target VM 116 will subsequently boot from in memory boot image 128, which is in a virtual CD format. Once changed, the boot sequence is as follows: removable devices, CD, hard disk, network.

Steps 302 through 308 may be the same for any VM migration process. In one embodiment, steps 302 through 308 may be automated into a single group of steps included in the initial VM provisioning process. In addition, in an embodiment where in memory boot image 128 is written onto a disk included in target VM 116 during VM provisioning, steps 306 and 308 may not be needed.

Migration orchestrator program 124 boots up target VM (step 310). Migration orchestrator program 124 starts target VM 116 using in memory boot image 128. By booting target VM 116 with in memory boot image 128, the process is independent of the operating system.

Migration orchestrator program 124 configures network settings (step 312). Migration orchestrator program 124 configures the network of target VM 116 with IP addresses assigned when cloud provisioning component 122 provisioned target VM 116. Correct IP addresses are needed to give target VM 116 network accessibility, and it is advantageous to be able to map multiple IP addresses to the correct interfaces. Migration orchestrator program 124 uses one of a plurality of tools known in the art for network setting configuration that do not require a network connection to perform the configuration. In addition to network settings, migration orchestrator program 124 may also configure a corresponding subnet, a gateway, and a network route. Configuring the network settings is advantageous because, with existing techniques, the target environment may have different network addresses and require a root password to the source instance, whereas embodiments of the present invention ensure network access and authentication to the image after copying.

Migration orchestrator program 124 mounts file server (step 314). As part of the migration process, migration orchestrator program 124 mounts file server 108 to target VM 116, i.e., makes shared image 110 accessible to the OS on target VM 116 by giving file server 108 a mount point or reference address. Because file server 108 and target VM 116 both reside in customer zone 101, mounting file server 108 provides a secure environment for data flows.

Migration orchestrator program 124 copies shared image (step 316). Migration orchestrator program 124 copies shared image 110 from file server 108 to target VM 116. In order to copy shared image 110 to target VM 116, migration orchestrator program 124 may identify a disk layout of shared image 110. In one embodiment, shared image 110 is an open virtualization format (OVF) file that contains metadata of a virtual machine and virtual disk files, e.g., VM templates and VM images, in virtual machine disk (VMDK) format. VMDK format is a file format that describes containers for virtual hard disk drives to be used in virtual machines. Migration orchestrator program 124 processes the metadata to identify the disk layout. In one embodiment, migration orchestrator program 124 uses a block-copy method to dump virtual disk files from shared image 110 onto the respective local disks of target VM 116. In another embodiment, migration orchestrator program 124 may include a decompressing step in the copying operation. Copying the shared image to target VM 116 properly reformats the data which is advantageous because the standard format is not directly runnable.

Migration orchestrator program 124 identifies and mounts primary disk (step 318). In one embodiment, migration orchestrator program 124 relies on administration data interface tools, which allow external manipulation of the OS, to run scripts, such as scripts 112, after the boot up of target VM 116. A primary disk is the first disk of a migrated system and the disk that contains the OS. In order to inject scripts 112, migration orchestrator program 124 identifies and mounts a primary disk containing the administration data interface tools configuration folder. Embodiments of the present invention are advantageous because they can map multiple disks correctly.

Migration orchestrator program 124 injects scripts (step 320). Migration orchestrator program 124 copies scripts 112 into the administration data interface tools configuration folder and configures scripts 112 for automated execution by target VM 116.

Migration orchestrator program 124 shuts down target VM (step 322). In order to complete the migration process, migration orchestrator program 124 unmounts the local disks to flush the drive caches persistent to the disks and shuts down target VM 116.

Migration orchestrator program 124 removes in memory boot image (step 324). Migration orchestrator program 124 removes in memory boot image 128 from the configuration of target VM 116. In one embodiment, migration orchestrator program 124 changes the boot sequence back to the original boot sequence, previously changed in step 308, in case another CD is attached to target VM 116 in the future and should follow hard disk in the boot sequence.

Figure 4:
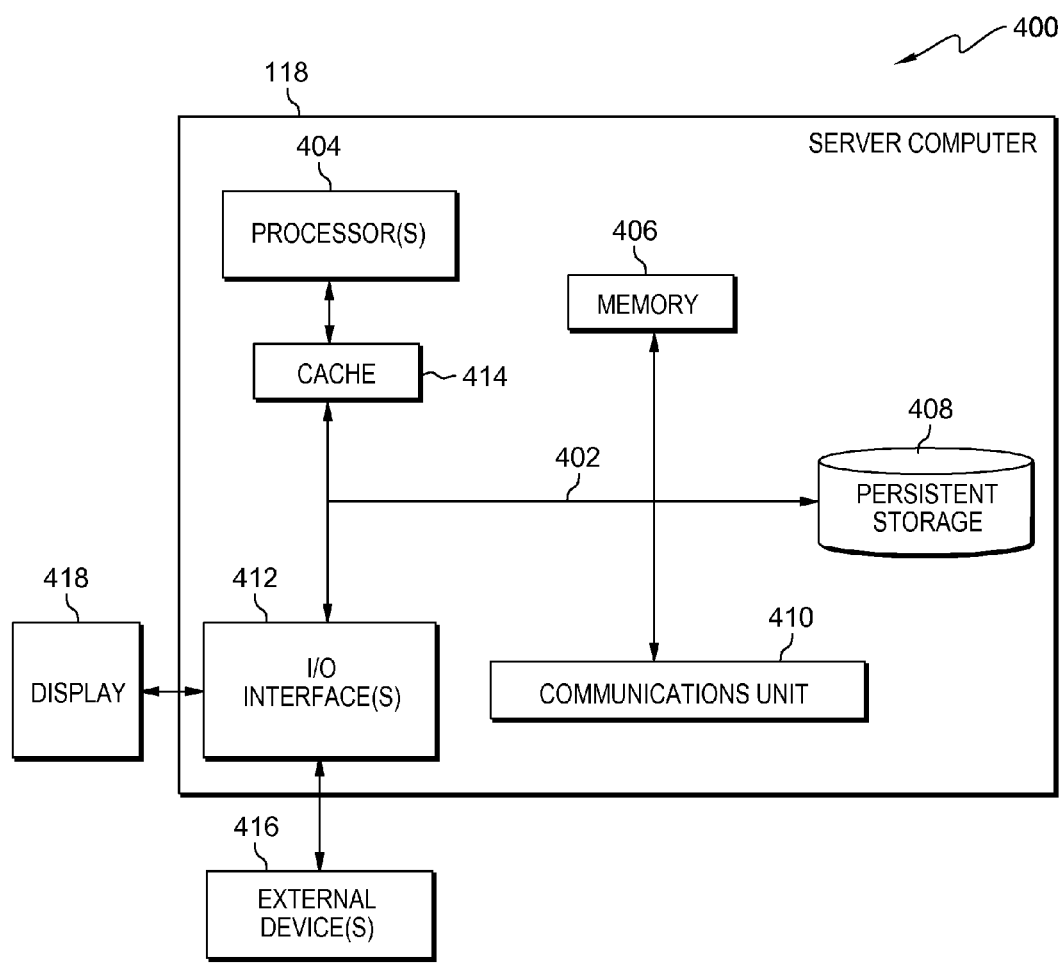
FIG. 4 depicts a cloud computing node, in accordance with an embodiment of the present invention.

Referring now to FIG. 4, a schematic of an example of a cloud computing node is shown. Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a server computer 118, which is operational with numerous other general purpose or special purpose computing system environments or configurations. Examples of well-known computing systems, environments, and/or configurations that may be suitable for use with server computer 118 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Server computer 118 may be described in the general context of computer system-executable instructions, such as program modules, being executed by a computer system. Generally, program modules may include routines, programs, objects, components, logic, data structures, and so on that perform particular tasks or implement particular abstract data types. Server computer 118 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, server computer 118 in cloud computing node 400 is shown in the form of a general-purpose computing device. Server computer 118 includes processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses. In an embodiment, communications fabric 402 represents one or more of any of several types of bus structures, including a memory bus or a memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of first computer 104, file server 108, and second computer 114. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to cloud computing node 400. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

It should be understood that although not shown, other hardware and/or software components could be used in conjunction with server computer 118. Examples include, but are not limited to: microcode, device drivers, redundant processing units, external disk drive arrays, RAID systems, tape drives, and data archival storage systems, etc.

Figure 5:
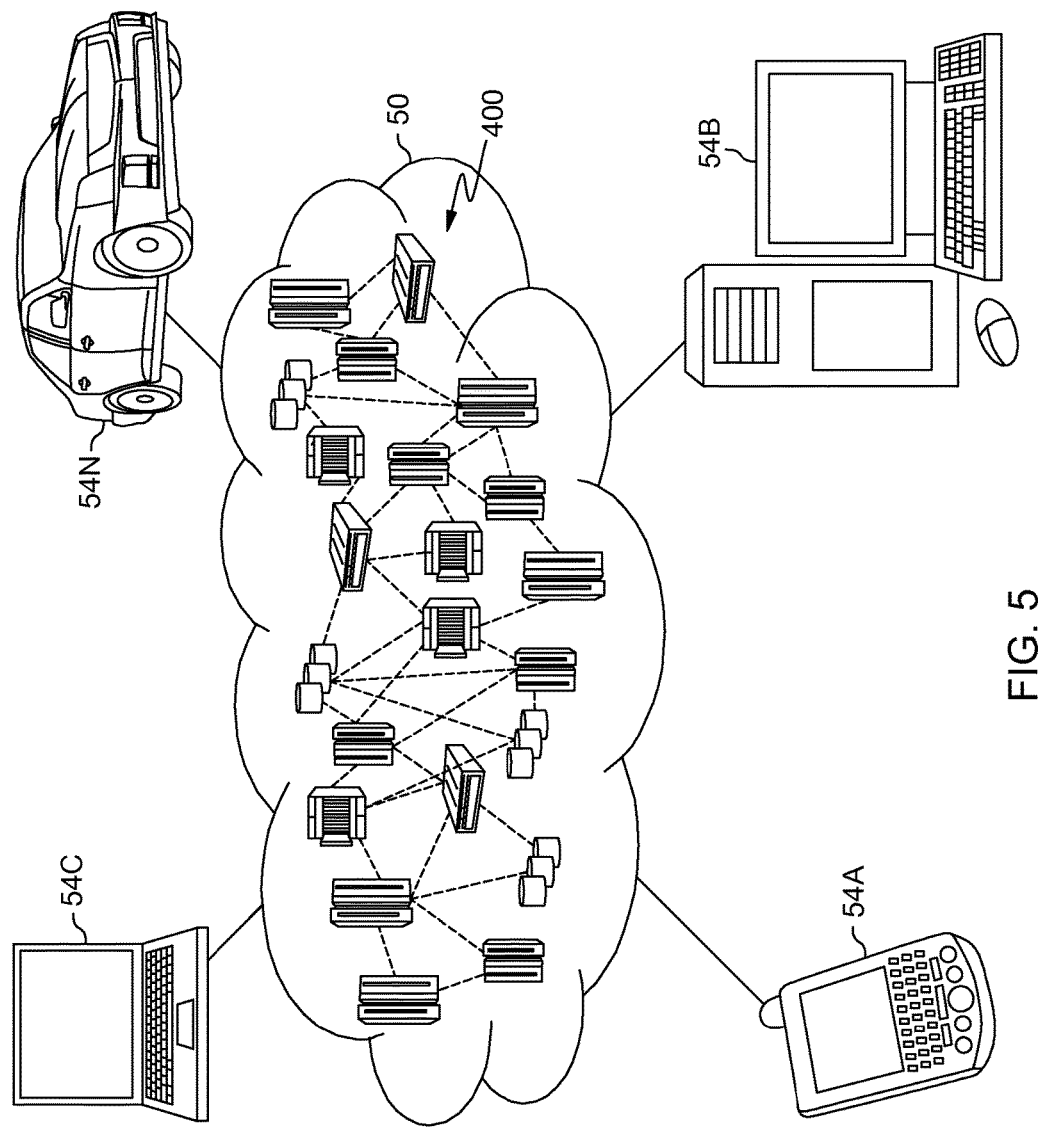
FIG. 5 depicts a cloud computing environment, in accordance with an embodiment of the present invention.

Referring now to FIG. 5, illustrative cloud computing environment 50 is depicted. As shown, cloud computing environment 50 comprises one or more cloud computing nodes 400 with which local computing devices used by cloud consumers, such as, for example, personal digital assistant (PDA) or cellular telephone 54A, desktop computer 54B, laptop computer 54C, and/or automobile computer system 54N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 400 and cloud computing environment 50 can communicate with any type of computerized device over any type of network and/or network addressable connection (e.g., using a web browser).

Figure 6:
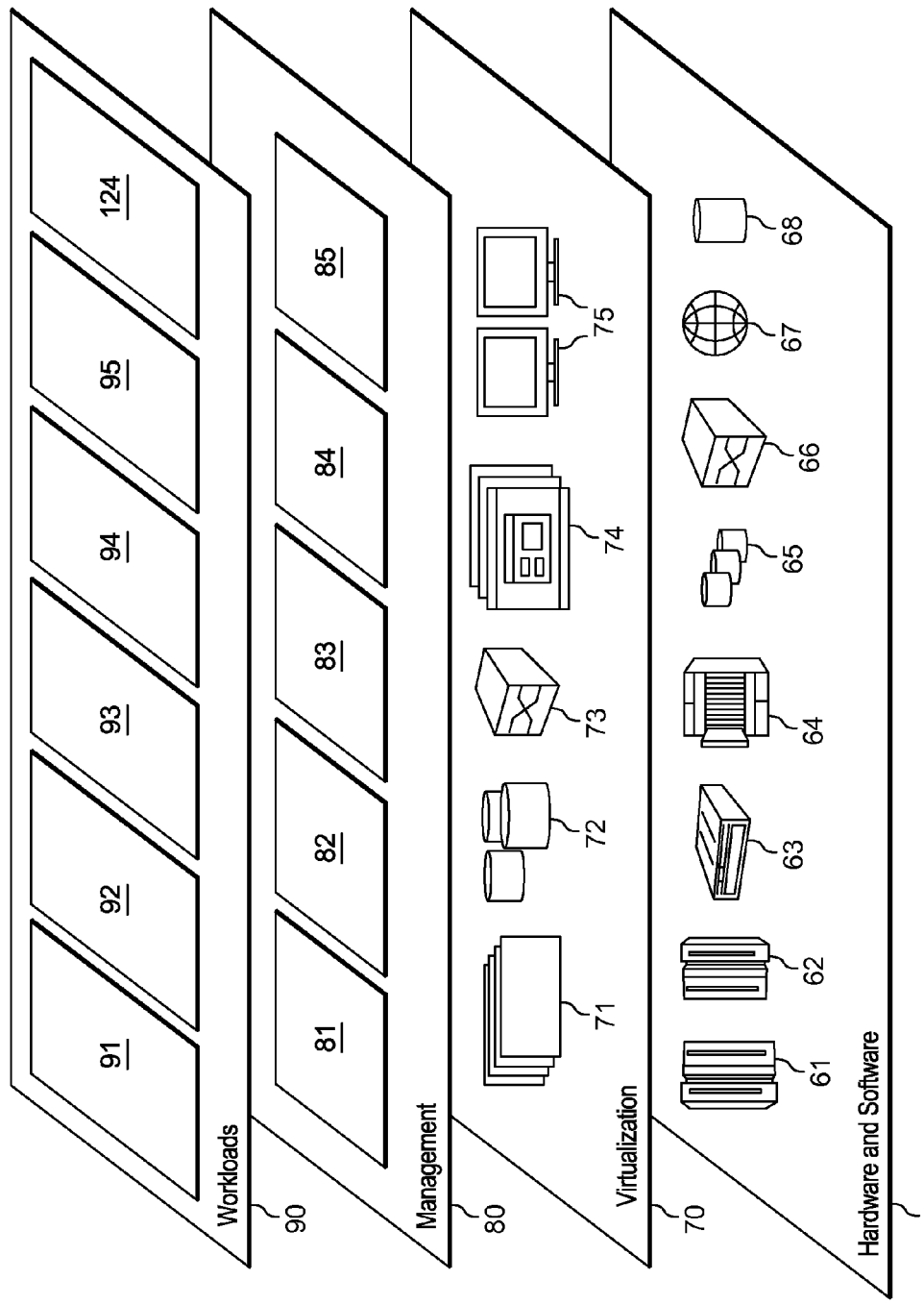
FIG. 6 depicts abstraction model layers, in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and migration orchestrator program 124.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    provisioning, by one or more computer processors, an instance, wherein the instance includes one or more local disks, and wherein the instance resides in a secured environment;
    shutting down, by the one or more computer processors, the instance;
    attaching, by the one or more computer processors, an in memory boot image to the instance, wherein the in memory boot image includes an operating system;
    changing, by the one or more computer processors, a boot sequence such that subsequent booting of the instance utilizes the attached in memory boot image;
    booting, by the one or more computer processors, the instance with the in memory boot image such that the operating system exists in a main memory of the instance;
    copying, by the one or more computer processors, an image file to the one or more local disks of the instance, wherein copying the image file overwrites the one or more local disks; and
    rebooting, by the one or more computer processors, the instance.

2. The method of claim 1, wherein the in memory boot image is a virtual compact disk.

3. The method of claim 1, further comprising, after said booting the instance from the in memory boot image, configuring, by the one or more computer processors, network settings for the instance, said configuring comprising assigning, by the one or more computer processors, correct internet protocol addresses such that the instance has network accessibility.

4. The method of claim 1, wherein said copying an image file to the one or more local disks of the instance comprises:
    mounting, by the one or more computer processors, a file server such that an image file included in the file server is accessible to the operating system of the instance; and
    copying, by the one or more computer processors, the image file from the file server to the one or more local disks of the instance.

5. The method of claim 1, further comprising:
    identifying, by the one or more computer processors, a primary disk of the instance;
    mounting, by the one or more computer processors, the primary disk; and
    injecting, by the one or more computer processors, one or more scripts into the primary disk such that the one or more scripts are run during a subsequent reboot of the instance.

6. The method of claim 1, wherein said rebooting the instance comprises:
    shutting down, by the one or more computer processors, the instance; and
    removing, by the one or more computer processor, the in memory boot image from the instance.

7. The method of claim 6, wherein said removing the in memory boot image from the instance comprises changing, by the one or more computer processors, a boot sequence to a standard boot sequence.

8. The method of claim 1, wherein the instance comprises at least one of: a physical machine, a virtual machine, or a server.

9. A computer program product comprising:
    one or more computer readable storage devices and program instructions stored on the one or more computer readable storage devices, the stored program instructions comprising:
    program instructions to provision an instance, wherein the instance includes one or more local disks, and wherein the instance resides in a secured environment;
    program instructions to shut down the instance;
    program instructions to attach an in memory boot image to the instance, wherein the in memory boot image includes an operating system;
    program instructions to change a boot sequence such that subsequent booting of the instance utilizes the attached in memory boot image;

program instructions to boot the instance with the in memory boot image such that the operating system exists in a main memory of the instance;
program instructions to copy an image file to the one or more local disks of the instance, wherein copying the image file overwrites the one or more local disks; and
program instructions to reboot the instance.

10. The computer program product of claim 9, wherein the in memory boot image is a virtual compact disk.

11. The computer program product of claim 9, wherein the program instructions to copy an image file to the one or more local disks of the instance comprise:
program instructions to mount a file server such that an image file included in the file server is accessible to the operating system of the instance; and
program instructions to copy the image file from the file server to the one or more local disks of the instance.

12. The computer program product of claim 9, the stored program instructions further comprising:
program instructions to identify a primary disk of the instance;
program instructions to mount the primary disk; and
program instructions to inject one or more scripts into the primary disk such that the one or more scripts are run during a subsequent reboot of the instance.

13. The computer program product of claim 9, wherein the program instructions to reboot the instance comprise:
program instructions to shut down the instance; and
program instructions to remove the in memory boot image from the instance.

14. A computer system comprising:
one or more computer processors;
one or more computer readable storage devices;
program instructions stored on the one or more computer readable storage devices for execution by at least one of the one or more computer processors, the stored program instructions comprising:
program instructions to provision an instance, wherein the instance includes one or more local disks, and wherein the instance resides in a secured environment;
program instructions to shut down the instance;
program instructions to attach an in memory boot image to the instance, wherein the in memory boot image includes an operating system;
program instructions to change a boot sequence such that subsequent booting of the instance utilizes the attached in memory boot image;
program instructions to boot the instance with the in memory boot image such that the operating system exists in a main memory of the instance;
program instructions to copy an image file to the one or more local disks of the instance, wherein copying the image file overwrites the one or more local disks; and
program instructions to reboot the instance.

15. The computer system of claim 14, wherein the in memory boot image is a virtual compact disk.

16. The computer system of claim 14, wherein the program instructions to copy an image file to the one or more local disks of the instance comprise:
program instructions to mount a file server such that an image file included in the file server is accessible to the operating system of the instance; and
program instructions to copy the image file from the file server to the one or more local disks of the instance.

17. The computer system of claim 14, the stored program instructions further comprising:
program instructions to identify a primary disk of the instance;
program instructions to mount the primary disk; and
program instructions to inject one or more scripts into the primary disk such that the one or more scripts are run during a subsequent reboot of the instance.

* * * * *